(12) United States Patent
Engerman

(10) Patent No.: US 12,055,198 B2
(45) Date of Patent: Aug. 6, 2024

(54) VEHICLE SYSTEM WITH MULTI-SPEED TRANSMISSION

(71) Applicant: Dana Automotive Systems Group, LLC, Maumee, OH (US)

(72) Inventor: Eric M. Engerman, Plymouth, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 17/818,917

(22) Filed: Aug. 10, 2022

(65) Prior Publication Data

US 2022/0381322 A1 Dec. 1, 2022

Related U.S. Application Data

(62) Division of application No. 17/083,188, filed on Oct. 28, 2020, now Pat. No. 11,460,093.

(51) Int. Cl.
  *F16H 3/00* (2006.01)
  *F16H 57/04* (2010.01)

(52) U.S. Cl.
  CPC .......... *F16H 3/006* (2013.01); *F16H 57/043* (2013.01); *F16H 57/0473* (2013.01); *F16H 2003/007* (2013.01); *F16H 2200/2038* (2013.01); *F16H 2200/2064* (2013.01); *F16H 2200/2069* (2013.01)

(58) Field of Classification Search
  CPC .... F16H 3/006; F16H 57/043; F16H 57/0473; F16H 2003/007; F16H 2200/2038; F16H 2200/2064; F16H 2200/2069

USPC .......................................................... 475/5
  See application file for complete search history.

(56) References Cited

U.S. PATENT DOCUMENTS

| | | | |
|---|---|---|---|
| 3,885,446 A | 5/1975 | Pengilly | |
| 4,040,309 A | 8/1977 | Wood et al. | |
| 4,640,141 A | 2/1987 | Knödel et al. | |
| 5,226,339 A | 7/1993 | Donato et al. | |
| 5,311,789 A | 5/1994 | Henzler et al. | |
| 6,397,692 B1 * | 6/2002 | Carriere | F16H 3/10 74/331 |
| 6,634,247 B2 | 10/2003 | Pels et al. | |
| 6,634,986 B2 | 10/2003 | Kima | |
| 6,953,409 B2 | 10/2005 | Schmidt et al. | |
| 7,238,131 B2 | 7/2007 | Raghavan et al. | |

(Continued)

FOREIGN PATENT DOCUMENTS

| | | |
|---|---|---|
| DE | 102016011263 A1 | 6/2017 |
| DE | 102018210897 A1 | 1/2020 |
| EP | 3363671 A1 | 8/2018 |

*Primary Examiner* — Colby M Hansen
(74) *Attorney, Agent, or Firm* — McCoy Russell LLP

(57) ABSTRACT

Methods and systems for a vehicle transmission are provided. A transmission system includes, in one example, an intermediate shaft rotationally coupled to an input shaft and an output shaft, wherein the input shaft is configured to receive rotational input from an electric machine. The system further includes a first gear coupled to the intermediate shaft, and a plurality of clutches coupled to the input shaft and the output shaft and configured to in a first mode, transfer power directly between a second gear coupled to the input shaft, the first gear, and a third gear coupled to the output shaft, and in a second mode, transfer power indirectly between the second gear, the first gear, and/or the third gear.

9 Claims, 5 Drawing Sheets

(56) References Cited

U.S. PATENT DOCUMENTS

| | | | |
|---|---|---|---|
| 7,611,433 | B2 | 11/2009 | Forsyth |
| 8,047,314 | B2 | 11/2011 | Oba et al. |
| 8,287,429 | B2 | 10/2012 | Kumazaki et al. |
| 8,622,862 | B2 | 1/2014 | Koyama et al. |
| 8,678,969 | B2 | 3/2014 | Sato et al. |
| 8,771,139 | B2 | 7/2014 | Ideshio et al. |
| 8,790,202 | B2 | 7/2014 | Sakai et al. |
| 9,707,834 | B2 | 7/2017 | Lee et al. |
| 10,018,253 | B2 | 7/2018 | Beck et al. |
| 2001/0013258 | A1 | 8/2001 | Kobayashi |
| 2003/0183028 | A1 | 10/2003 | Shimaguchi |
| 2010/0125020 | A1* | 5/2010 | Ikegami .................. B60L 58/12 475/5 |
| 2011/0113923 | A1 | 5/2011 | Pesola et al. |
| 2012/0115674 | A1* | 5/2012 | Ikegami .................. B60K 6/36 180/65.265 |
| 2013/0045833 | A1* | 2/2013 | Okubo .................. B60K 6/387 903/909 |
| 2013/0160587 | A1* | 6/2013 | Ibamoto .................. F16H 3/006 74/331 |
| 2015/0107408 | A1 | 4/2015 | Kaltenbach et al. |
| 2015/0362025 | A1 | 12/2015 | Schweiher et al. |
| 2019/0078672 | A1 | 3/2019 | Duan et al. |
| 2019/0186618 | A1 | 6/2019 | Portella et al. |
| 2019/0283578 | A1 | 9/2019 | Wang et al. |

\* cited by examiner

FIG. 2A
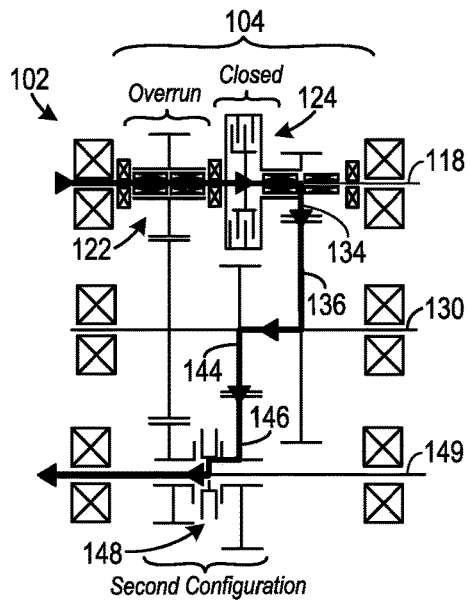
FIG. 2B
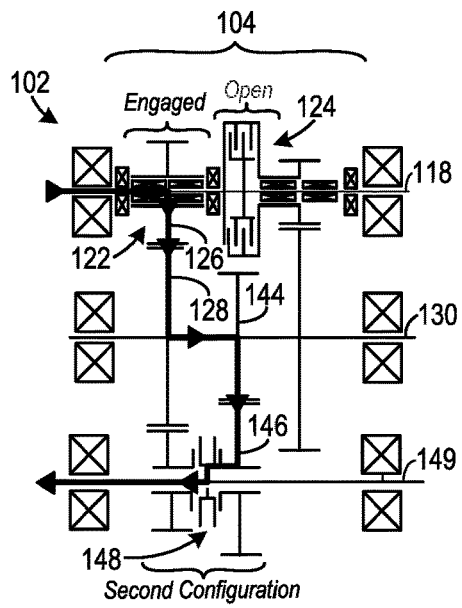
FIG. 2C
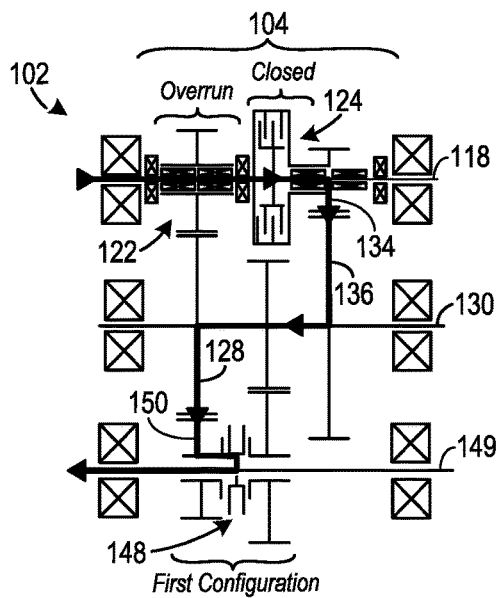
FIG. 2D
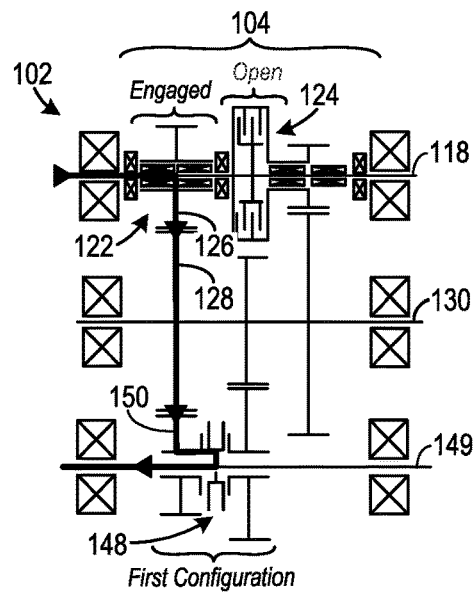
FIG. 2E
|  | First Gear | Second Gear | Third Gear | Fourth Gear |
|---|---|---|---|---|
| Clutch (122) | Overrun | Engaged | Overrun | Engaged |
| Clutch (124) | Closed | Opened | Closed | Opened |
| Clutch (148) | Second Configuration | Second Configuration | First Configuration | First Configuration |

FIG. 3A
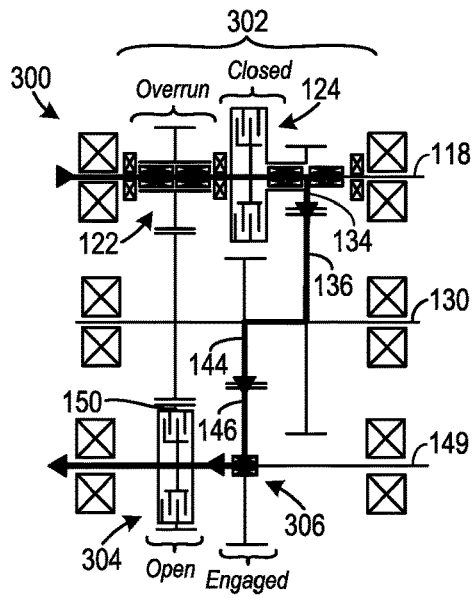
FIG. 3B
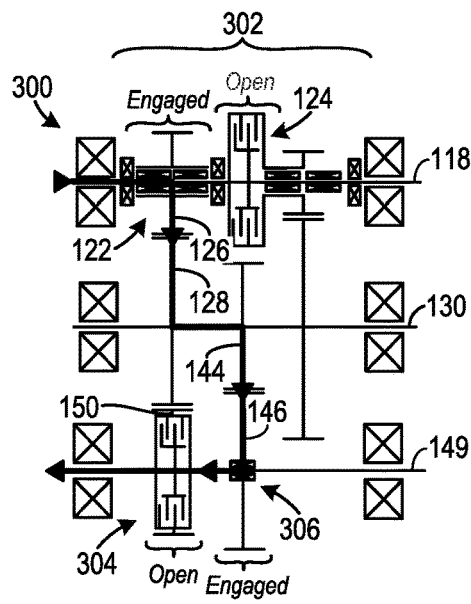
FIG. 3C
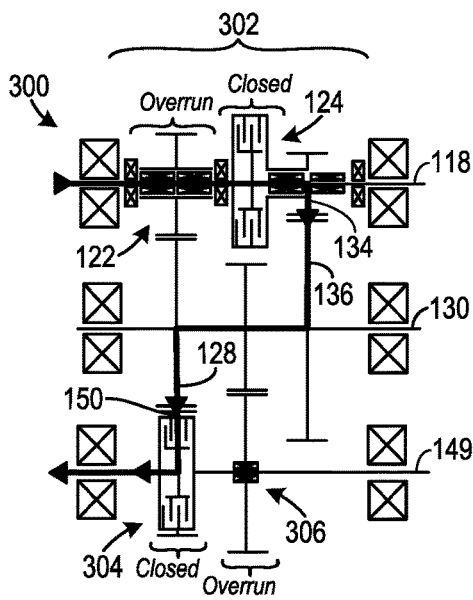
FIG. 3D
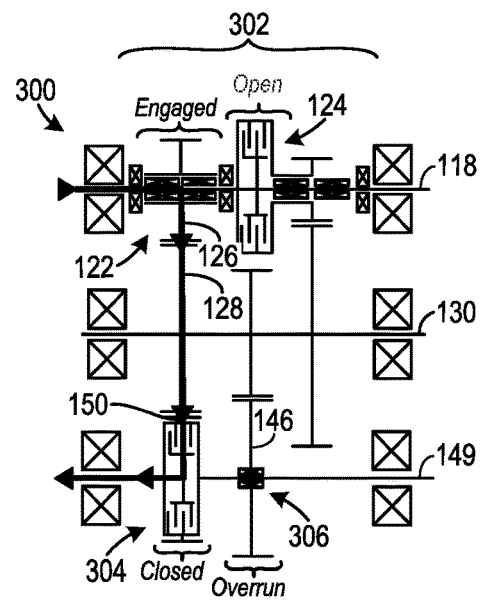
FIG. 3E
|  | First Gear | Second Gear | Third Gear | Fourth Gear |
|---|---|---|---|---|
| Clutch (122) | Overrun | Engaged | Overrun | Engaged |
| Clutch (124) | Closed | Open | Closed | Open |
| Clutch (304) | Open | Open | Closed | Closed |
| Clutch (306) | Engaged | Engaged | Overrun | Overrun |

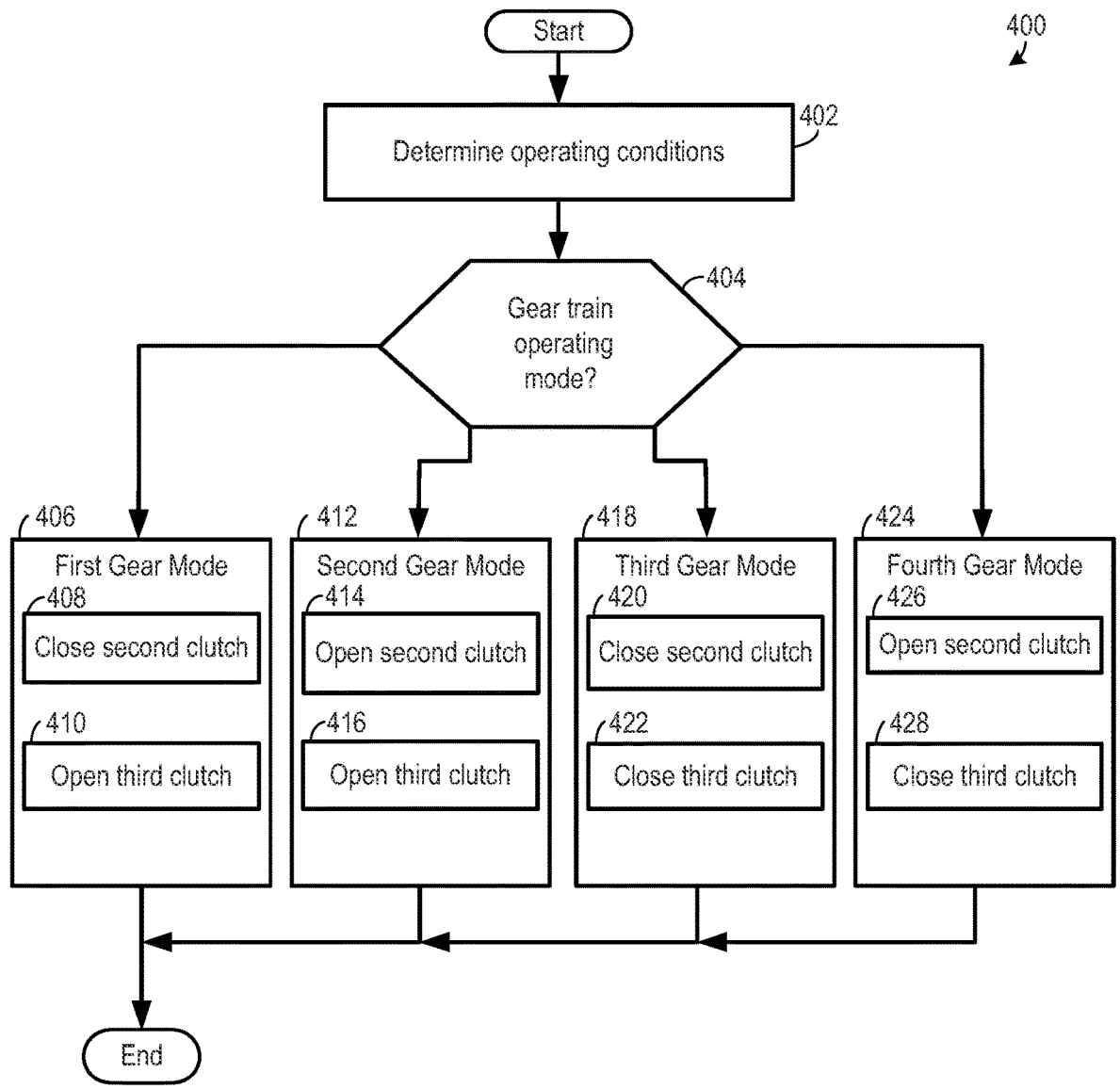

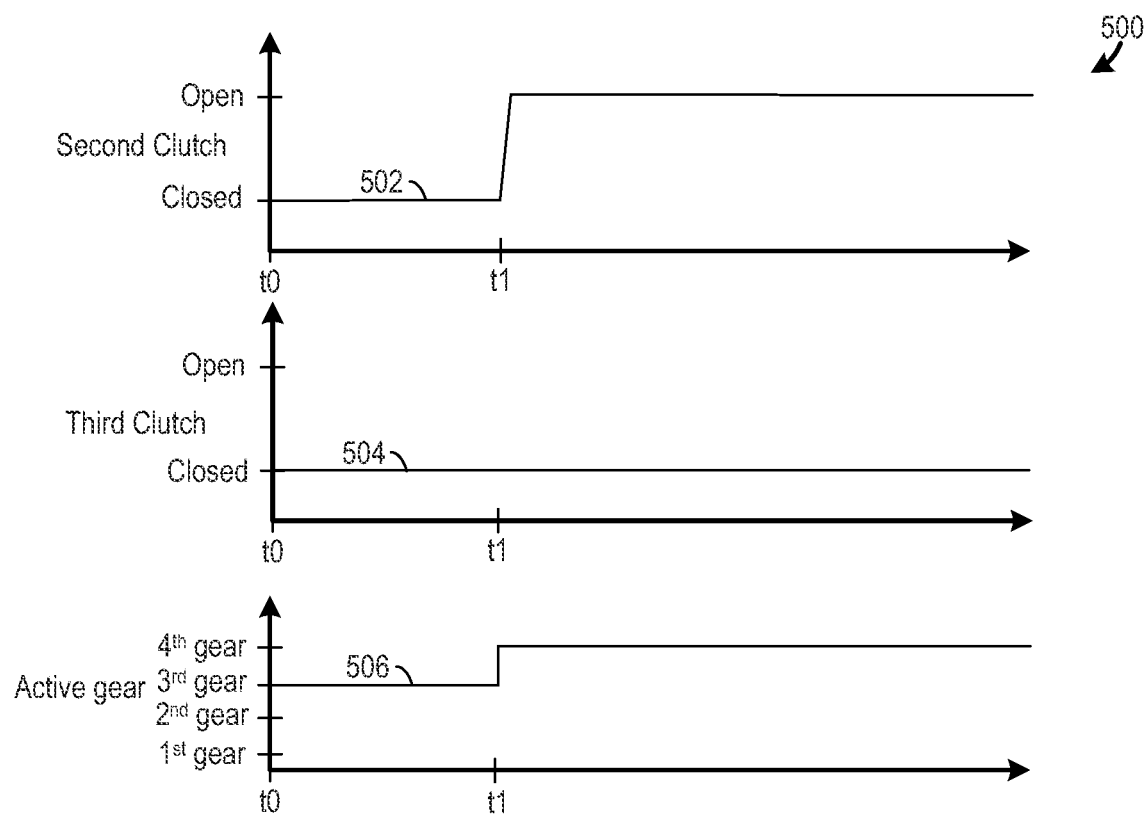

VEHICLE SYSTEM WITH MULTI-SPEED TRANSMISSION

CROSS REFERENCE TO RELATED APPLICATION

The present application is a divisional of U.S. Non-Provisional patent application Ser. No. 17/083,188, entitled "VEHICLE SYSTEM WITH MULTI-SPEED TRANSMISSION", and filed on Oct. 28, 2020. The entire contents of the above-listed application are hereby incorporated by reference for all purposes.

TECHNICAL FIELD

The present disclosure relates to an electric drive axle in a vehicle, and more particularly to a multi-speed transmission for a drive axle.

BACKGROUND AND SUMMARY

Electric and hybrid-electric vehicles utilize electric machines harnessing energy from electric power sources to provide drive, or augmented drive, to the vehicle. Attempts have been made to deploy electric drive axles in some vehicles, due in part to their greater adaptability than vehicles with motors spaced away from the axles. However, the inventors have recognized that previous electric drive axles and other types of transmissions have exhibited drawbacks related to available gears and packaging. Certain drivetrain designs have made tradeoffs between the number of available gears and packaging efficiency. For instance, some electric drivetrains have expanded available gear range at the expense of gearbox compactness. Other drivetrains have diminished gear selectability to increase the system's packaging efficiency. Large electric vehicle battery packs may exacerbate these drivetrain packaging challenges.

To overcome at least some of the aforementioned challenges a transmission system is provided. In one example, the transmission system includes an intermediate shaft rotationally coupled to an input shaft and an output shaft. The input shaft is configured to receive rotational input from an electric machine. The transmission system additionally includes a first gear coupled to the intermediate shaft and a plurality of clutches coupled to the input and output shafts. The clutches are designed to transfer power directly between a second gear coupled to the input shaft, the first gear, and a third gear coupled to the output shaft, in a first mode. In a second mode, the clutches are configured to transfer power indirectly between the second gear, the first gear, and/or the third gear. In this way, the first gear functions as a pinion gear and an idler gear during different operating conditions. The dual use of the gear on the intermediate shaft allows for the space efficient expansion of the number of available gears in the system.

In another example, the plurality of clutches include a first clutch and a second clutch coupled to the input shaft and a third clutch coupled to the output shaft. In this example, the second and third clutches may be actively controlled to transition the system between the first and the second modes of operation. Thus, coordinated control of this compact clutch arrangement may be used to shift the system into different active gears.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-2D show power paths for different operating gears of the transmission system, depicted in FIG. 1.

FIG. 2E shows a table indicating the configuration of the system's clutches in different operating gears, in the first embodiment.

FIGS. 3A-3D show power paths for different operating gears of a second embodiment of a transmission system.

FIG. 3E shows a table indicating the configuration of the system's clutches in different operating gears, in the second embodiment.

FIG. 4 shows a method for controlling a transmission system.

FIG. 5 shows a timing diagram of a use-case transmission system control strategy.

DETAILED DESCRIPTION

Figure 1:
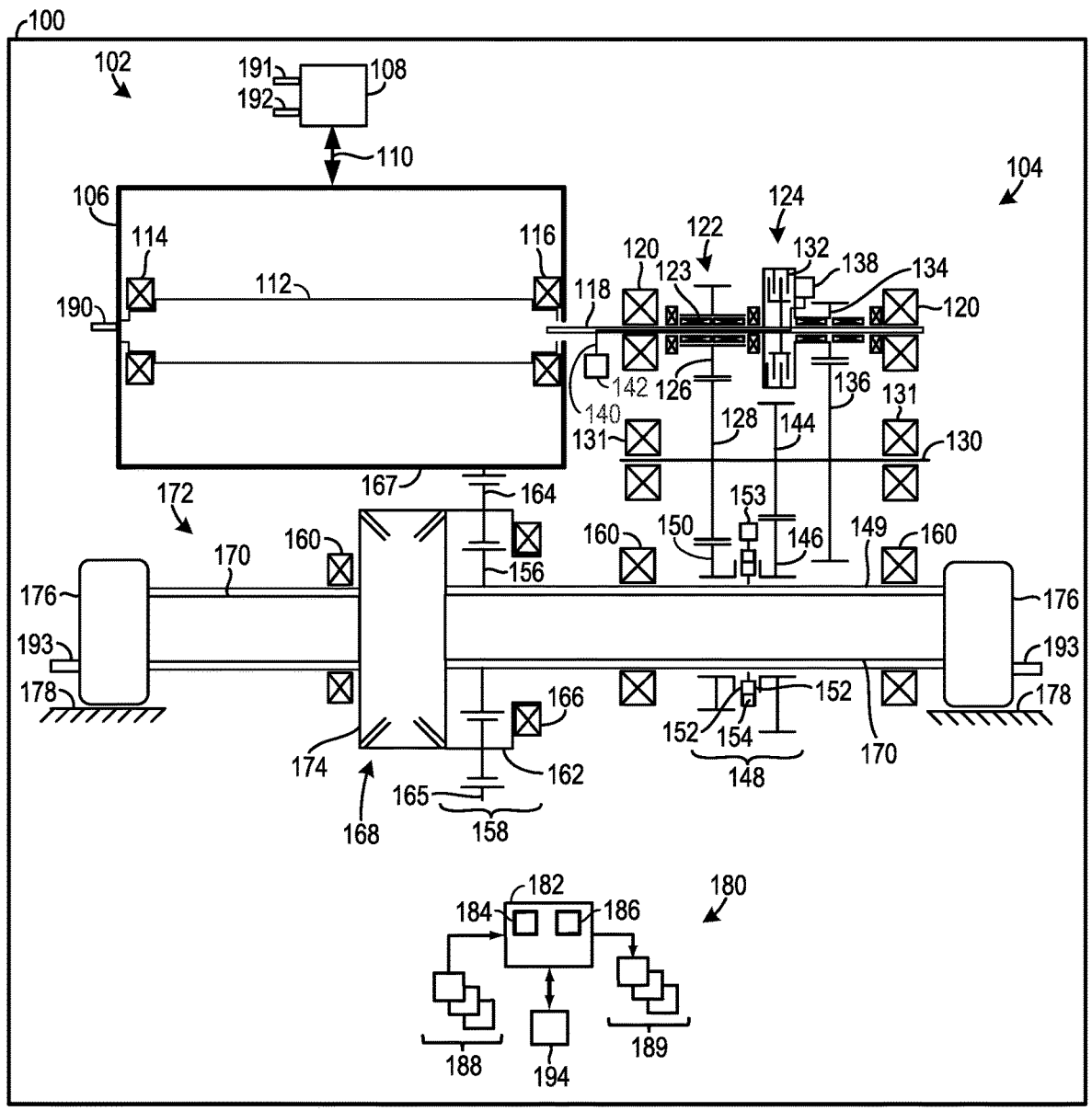
FIG. 1 is a schematic representation of a vehicle including a first embodiment of a transmission system.

A transmission system with three or more selectable gears is described herein. A compact layout of clutches in the system allows the system to achieve greater gear ratio selection without unduly impacting the system's space efficiency. The transmission system, in one example, includes a first and a second clutch arranged on an input shaft and a third clutch on an output shaft. An intermediate shaft is arranged between the input and output shaft with a gear coupled thereto. The clutches are designed to modify the system's power path through the intermediate gear. In a first mode, the gear on the intermediate shaft acts as an idler gear, where power directly flows between gears on the input and output shaft and the gear on the intermediate shaft. In a second mode, the gear on the intermediate shaft acts as a pinion gear, where power indirectly flows between gears on the input and output shaft and the gear on the intermediate shaft. The intermediate shaft gear therefore has dual-use functionality, increasing the system's available gear ratios, without excessively increasing the size and complexity of the system, if desired. The second mode may be a mode where the system's active gear is a first, second, or in some cases, a third gear. Conversely, the second mode may be a mode where the system's active gear is a third gear or a fourth gear in the case of a four-speed transmission. In this way, the transmission can achieve three or more selectable gears in a relatively compact package. Increasing the number of available gears in the system allows vehicle performance and efficiency to be increased, if desired.

In another example, the plurality of clutches may include a first and a second clutch coupled to the input shaft and a third clutch coupled to the output shaft. Coordinated operation of the clutches may be used to shift into one of three, or in some examples four active gears. For instance, in one embodiment, the first clutch may be a one-way clutch, the second clutch may be a friction clutch, and the third clutch may be a friction clutch or a dog clutch. In the first mode, the first clutch and the third clutch may be engaged. The clutch engagement allows direct power transfer through a gear on the intermediate shaft from a gear on the input shaft gear and to an output shaft gear. In other gears, the power paths bypass the first clutch or the third clutch, to enable the dual-use of the gear on the intermediate shaft. When the second clutch is configured as a friction clutch, the clutch may be actuated via a piston actuator which may receive fluid from a conduit routed through the input shaft. Internally routing piston actuation hydraulics in this manner increases the system's space efficiency. Further in one example, the piston actuator may be a hydrostatic balance piston, facilitating rapid clutch actuation.

FIG. 1 schematically illustrates a vehicle with a first embodiment of a transmission system designed with multiple gear ratios. FIGS. 2A-2D illustrate the power paths in different gears in the first embodiment of the transmission system, facilitating the expansion of the system's available gears in a compact arrangement. FIG. 2E depicts a chart corresponding to the configurations of the clutches in the different gears in the first embodiment of the system. FIGS. 3A-3D illustrate the power paths in different gears in a second embodiment of the transmission system, where one-way and friction clutches are coupled to each of the input and output shafts, again allowing a compact clutch arrangement to be used to shift the system between the different active gears. FIG. 3E depicts a chart corresponding to the configurations of the clutches in the different gears in the second embodiment of the system. FIG. 4 shows a method for shifting between the different gears using a compact clutch arrangement on multiple axially offset gear shafts. FIG. 5 illustrates a timing diagram for a use-case transmission operating strategy for seamlessly shifting between two active gears.

FIG. 1 shows a schematic depiction of a vehicle 100 having a system 102 with a transmission 104 and an electric machine 106 (e.g., electric motor-generator). The stick diagram of FIG. 1 provides a topology of the vehicle, transmission, and corresponding components. Furthermore, the system 102 shown in FIG. 1 is a system deployed in an electric drive axle. However, the system may be used in different types of vehicles such as vehicles using an internal combustion engine as a motive power source.

The electric machine 106 is electrically coupled to an energy storage device 108 (e.g., battery, capacitor, combinations thereof, and the like). Arrows 110 signify the energy transfer between the electric machine 106 and the energy storage device 108 that may occur during different modes of system operation. The electric machine 106 may include conventional components for generating rotational output (e.g., forward and reverse drive rotational output) and/or electrical energy for recharging the energy storage device 108 such as a rotor electromagnetically interacting with a stator, to provide the aforementioned energy transfer functionality.

The electric machine 106 includes a rotor shaft 112 with a first bearing 114 and a second bearing 116 coupled thereto. The bearings 114, 116 as well as the other bearings described herein may include components such as inner races, outer races, roller elements (e.g., ball bearings, cylindrical rollers, tapered cylindrical rollers, etc.). It will be appreciated that the sized and/or construction of the bearings may be selected based on expected rotational speeds of the components to which they are attached, packaging constraints, etc. As such, the size and/or configuration of at least a portion of the bearings may vary, in some cases. However, at least a portion of the bearings may have similar sizes and/or constructions.

The second bearing 116 is shown positioned within the electric machine. However, other bearing arrangements with regard to the electric machine have been contemplated such as arrangements with alternative quantities, types, and/or locations of bearings.

The vehicle may take a variety of forms in different embodiments such as a light, medium, or heavy duty vehicle. The vehicle 100 may therefore be hybrid vehicle where both the electric machine 106 and an internal combustion engine (not shown) are utilized for motive power generation. For instance, in one use-case hybrid vehicle configuration, the internal combustion engine may assist in recharging the energy storage device 108, during certain conditions. In another use-case hybrid vehicle configuration, the internal combustion engine may be configured to provide rotational energy to the differential 168 or other suitable locations in the transmission 104. In yet another use-case hybrid vehicle configuration, the engine may provide rotational input to another drive axle (not shown). Further, in other examples, the vehicle may be a battery electric vehicle (BEV) where the internal combustion engine is omitted.

The rotor shaft 112 of the electric machine 106 is coupled to an input shaft 118. For instance, the rotor shaft 112 may be transition fit, slip fit, mechanically attached, in splined engagement, etc. with an end of the input shaft 118.

Bearings 120 are coupled to the input shaft 118. As such, the bearings 120 support (e.g., axially and/or radially support) and facilitate rotation of the input shaft 118. A first clutch 122 and a second clutch 124 are coupled to the input shaft 118. The first clutch 122 may a one-way clutch designed to operate in an engaged and disengaged configuration. In the engaged configuration, power flows between the components to which it is coupled while in a disengaged configuration, the power flow is inhibited.

In one example, the first clutch 122 may a sprag clutch. In such an example, the sprag clutch comprises a plurality of sprag mechanisms 123 mounted on carrier rings. The sprag mechanisms may be spring loaded and have asymmetric profiles with curved engagement surfaces. An outer race may at least partially circumferentially surround the sprag mechanisms and an inner race on the input shaft 118 may be located radially inboard from the sprag mechanisms. When engaged, the curved surfaces of the sprag mechanisms engage the outer race and the inner race to transfer power from the input shaft 118 to a first gear 126. Sprag clutches have relatively low drag (e.g., substantially zero drag) in the disengaged configuration and provide a strong and robust engagement mechanism. Other types of one-way clutches have however been envisioned, such as a one-way clutch with pawls and detents. The gears described herein are sequentially numbered in the order they are introduced and the numbering does not denote gear size. However, the gears may have a different numbering scheme, in other examples. Furthermore, the relative sizing of the different gears may be ascertained from the illustration of the system 102, provided in FIG. 1.

The one-way clutch 122 is designed to operate in an engaged configuration where power is transferred from the inner race to the outer race and a disengaged configuration where power is not transferred between the inner and outer races. The engaged configuration may occur when the inner race is rotating in a first direction and the disengaged configuration may occur when the inner race is rotating in a second direction opposite the first or is overrun. It will therefore be appreciated that the one-way clutch passively transitions between different configurations based on the operating conditions in the transmission and is not actively controlled. However, in alternative examples, the first clutch may be an actively controlled clutch, such as a friction clutch.

The first gear 126 is rotationally coupled to a second gear 128. As discussed herein, rotational coupling between gears denotes the mechanical coupling of the gears via a mesh including mated teeth. The second gear 128 is coupled to an intermediate shaft 130. Thus, the second gear 128 may be welded, press fit, in splined engagement, or integrally formed with the intermediate shaft, for instance. The other gears on the intermediate shaft may be attached to shaft using any of the aforementioned techniques. Bearings 131 support and enable rotation of the intermediate shaft 130.

The second clutch 124 may be a friction clutch with a plurality of friction discs 132 designed to frictionally engage and disengage one another in different configurations. To elaborate, the friction clutch may be a wet clutch where lubricant is routed through the friction discs to cool and lubricate the disc pack. When the second clutch 124 is closed (engaged) power flows from the input shaft to a third gear 134 coupled to the clutch and then to a fourth gear 136 on the intermediate shaft 130. Conversely, when the second clutch 124 is open (disengaged) power flow between the input shaft 118 and the third gear 134 ceases to occur.

An actuator 138 is also provided in the system 102 and designed to actively open and close the second clutch 124 (e.g., the friction clutch). The actuator 138 in the depicted example is a hydraulic actuator. Specifically, in one example, the hydraulic actuator may be a hydrostatic balance piston, allowing the second clutch to be reliably actuated. In the hydraulic actuation embodiment, a hydraulic conduit 140 (e.g., lubricant conduit) is routed through and traverses the input shaft 118 to compactly route pressurized fluid to the actuator 138. The hydraulic conduit may also supply lubricant to the disc pack in the clutch. Routing the hydraulic conduit 140 through the input shaft 118 also provides a more protected conduit arrangement less susceptible to degradation from external impacts, such as impacts from road debris. A hydraulic system is schematically indicated at 142. The hydraulic system 142 may include conventional components such as a hydraulic reservoir, hydraulic pump(s), valve(s), etc. to allow for the delivery of pressurized fluid to the actuator 138 of the second clutch 124.

A fifth gear 144 also resides on the intermediate shaft 130. The fifth gear 144 is directly coupled to a sixth gear 146 which is attached to a third clutch 148. Additionally, the second gear 128 is coupled to a seventh gear 150 attached the third clutch 148. The third clutch 148 resides on an output shaft 149 and is designed to selectively flow power from the sixth and seventh gears 146, 150 to the output shaft 149.

The third clutch 148 is a multi-faced dog clutch in the illustrated embodiment. The multi-faced dog clutch is designed to operate in a first configuration where power flows through the seventh gear 150 to the output shaft 149. Therefore, in the first configuration of the multi-faced dog clutch, power transfer occurs between the second gear 128, the seventh gear 150, and then the output shaft 149. Conversely, in a second configuration of the multi-faced dog clutch, power flows from the sixth gear 146 to the output shaft 149 by way of a mated interface in the clutch. Thus, in the second configuration of the dog clutch, the system's power path travels through the fifth gear 144, the sixth gear 146, and the output shaft 149 via another mated interface in the clutch.

To accomplish the aforementioned functionality the multi-face dog clutch may include toothed surfaces 152 on opposing axial sides of the clutch. These toothed surfaces may be axial shifted (e.g., left and right in the frame of reference of FIG. 1) to induce engagement between teeth on the corresponding gear (sixth or seventh gears 146, 150). An actuator 153 may be used to shift the dog clutch in this manner. The actuator 153 may be a hydraulic actuator, electronic actuator (e.g., a solenoid), a pneumatic actuator, combinations thereof, etc. The dog clutch may further include a synchronization mechanism 154 to allow for smooth engagement when transitioning into the different clutch configurations. To elaborate, in one example, the synchronization mechanism 154 provides speed matching between the clutch teeth on the output shaft gear and the teeth on the intermediate shaft gears. For instance, the mechanism may include a cone clutch and a blocking ring to accomplish this synchromesh functionality. The synchronizer may reduce (e.g., eliminate) the chance of harsh shifts but may also increase system costs. However, in other embodiments the third clutch may a friction clutch with a disc pack such as in the embodiment of the transmission depicted in FIGS. 3A-3D and described in greater detail herein.

The output shaft 149 after receiving power from the third clutch 148 in turn transfers power to downstream components. Specifically, the output shaft 149 is coupled to a sun gear 156 of a planetary gear set 158, in the illustrated example. However, other system arrangements of the system have been envisioned, such as a non-planetary gear reduction downstream of the output shaft. Bearings 160 support and facilitate rotation of the output shaft 149. The planetary gear set 158 provides a compact gear reduction and includes a carrier 162 with planet gears 164 meshing with a ring gear 165 and the sun gear 156. Bearing 166 in the system facilitate rotation of the carrier and the sun gear may have a bearing coupled thereto. The ring gear 165 is grounded to the motor housing 167, in the illustrated embodiment. However, other gears in the planetary gear set such as the carrier may be grounded, in other embodiments, to achieve another suitable gear ratio.

The carrier 162 is rotationally coupled to a differential 168 providing power to axle shafts 170 of an axle 172. The axle shafts 170 may be arranged co-axial to the output shaft 149. Specifically, in one example, the output shaft 149 may circumferentially surround a portion of the axle shafts 170. In this way, system's compactness is increased. However, alternative arrangements of the axle shafts and the output shaft may be used.

The axle shafts 170 are coupled to drive wheels 176 on driving surface 178. The differential 168 may include a case 174 housing gearing such as pinion gears, spider gears, etc. to achieve the aforementioned torque transfer. To elaborate, the differential 168 may be an electronic locking differential, in one example. In another example, the differential 168 may be an electronic limited slip differential or a torque vectoring dual clutch. In other examples, an open differential may be used. Referring to the locking differential example, when unlocked, the locking differential may allow the drive wheels 176 to spin at different speeds and conversely, when locked, the locking differential may force the drive wheels to rotate at the same speed. In this way, the transmission configuration can be adapted to increase traction, under certain driving conditions. In the case of the limited slip differential, the differential allows the deviation of the speed between shafts 170 coupled to the drive wheels 176 to be constrained.

The axle 172 may be a beam axle, in one example. A beam axle, also referred to in the art as a solid axle or rigid axle, may be an axle with mechanical components structurally supporting one another and extending between drive wheels coupled to the axle. Thus, wheels coupled to the axle may move in unison when articulating. For instance, the beam axle may be a structurally continuous axle spanning the drive wheels on a lateral axis, in one embodiment. In another embodiment, the beam axle may include co-axial shafts receiving rotational input from different gears in the differential and structurally supported by the differential.

The vehicle 100 may also include a control system 180 with a controller 182. The controller 182 includes a processor 184 and memory 186. The memory 186 may hold instructions stored therein that when executed by the processor cause the controller 182 to perform the various methods, control techniques, etc., described herein. The processor 184 may include a microprocessor unit and/or other types of circuits. The memory 186 may include known data storage mediums such as random access memory, read only memory, keep alive memory, combinations thereof, etc. The memory 186 may include non-transitory memory.

The controller 182 may receive various signals from sensors 188 positioned in different locations in the vehicle 100 and the transmission system 102. The sensors may include an electric machine speed sensor 190, an energy storage device temperature sensor 191, an energy storage device state of charge sensor 192, wheel speed sensors 193, etc. The controller 182 may also send control signals to various actuators 189 coupled at different locations in the vehicle 100 and the transmission system 102. For instance, the controller 182 may send signals to the electric machine 106 and the energy storage device 108 to adjust the rotational speed and/or direction of the electric machine. The controller 182 may also send signals to the second clutch 124 and the third clutch 148 to shift into different active gears (e.g., a first, second, third, and in some cases fourth gear). For instance, the second clutch 124 may be closed and the third clutch 148 may be placed in the second configuration in a first gear mode, described in greater detail herein. The other controllable components in the vehicle and transmission system may function in a similar manner with regard to command signals and actuator adjustment. For instance, the electric machine 106 may receive command signals from the controller 182 and responsive to receiving the command adjust the rotational output.

The vehicle 100 may also include an input device 194 (e.g., a gear selector such as a gear stick, gear lever, etc., console instrument panel, touch interface, touch panel, keyboard, combinations thereof, etc.). The input device 194, responsive to driver input, may generate a mode request indicating a desired gear ratio for the transmission. For instance, in a use-case example, the driver may shift a gear selector into a gear mode (e.g., first gear mode, second gear mode, etc.) to generate a gearshift request at the controller. In response, the controller commands transmission components (e.g., the second clutch 124 and the third clutch 148) to initiate a transition into a first gear mode. Other gear shifting transients may occur in a similar fashion. However, more mechanical gearshift strategies as well as automatic shifting strategies have also been envisioned. The controller may automatically place the transmission in the first gear mode or the second gear mode based on vehicle speed and/or load, for example. The system 102 may also be operated in a regeneration mode and a reverse mode. In the regenerative mode, energy is extracted from the transmission using the electric machine 106 and transferred to the energy storage device 108. For instance, the electric machine 106 may be placed in a generator mode where at least a portion of the rotational energy transferred from the drive wheels to the generator by way of the transmission is converted into electrical energy.

FIGS. 2A-2D illustrate the system 102 with the transmission 104 operating in discrete active gears. The gears are referred to as a first, second, third, and fourth gear. In this case, sequential numbering of the gears may denote the relative gear ratios. For instance, the first gear may be used during relatively lower speed vehicle operation while the second, third, and in some cases fourth gear may be used during higher speed vehicle operation. However, it will be understood that the sequential number of the other system components such as the gears coupled to the shafts does not denote relative size of these components.

FIG. 2A illustrates the system 102 with the transmission 104 operating in a first gear. In the first gear, the first clutch 122 (e.g., one-way clutch) is overrun, the second clutch 124 (e.g., the friction clutch) is closed, and the third clutch 148 is in the second configuration where the mesh between the fifth gear 144 and the sixth gear 146 transfers power to the output shaft 149. In one example, when transitioning the third clutch 148 into the second configuration, the synchronization mechanism 154, shown in FIG. 1, may provide speed matching between the clutch gear and the output shaft. In this way, the third clutch is smoothly engaged and the chance of NVH occurring during clutch engagement is reduced.

In the first gear mode, the system's power path unfolds as follows: power is transferred from an upstream electric machine (e.g., the electric machine 106 depicted in FIG. 1) to the input shaft 118. Next, the power path moves through the first clutch 122 (e.g., one-way clutch) which is overrun and to the third gear 134 via the second clutch 124. The power then flows from the third gear 134 to the fourth gear 136 on the intermediate shaft 130 and from the intermediate shaft to the fifth gear 144. Next power is transferred from the fifth gear 144 to the sixth gear 146 and then to the output shaft 149 by way of the third clutch 148. From the output shaft 149 power is transferred to downstream components such as a sun gear (e.g., sun gear 156, shown in FIG. 1), a differential (e.g., differential 168 shown in FIG. 1), axle shafts (e.g., axle shafts 170, shown in FIG. 1), and drive wheels (e.g., drive wheels 176 shown in FIG. 1).

In the second gear, depicted in FIG. 2B, the first clutch 122 is engaged, the second clutch 124 is open, and the third clutch 148 is in the second configuration. Thus, in the second gear, power flows from the electric machine to the input shaft 118 and from the input shaft through the first clutch 122 (e.g., one-way clutch) to the first gear 126. The power path then moves through the second gear 128 coupled to the intermediate shaft 130. Next, the power path moves through the intermediate shaft 130 to the fifth gear 144 and from the fifth gear to the sixth gear 146. Subsequently, power flows from the sixth gear 146 through the third clutch 148 to the output shaft 149. Again, power is transferred from the output shaft to downstream components.

In the third gear, depicted in FIG. 2C, the first clutch 122 (e.g., one-way clutch) is overrun, the second clutch 124 is closed, and the third clutch 148 is in the first configuration where the mesh between the second gear 128 and the seventh gear 150 transfers power to the output shaft 149. As previously discussed, the third clutch may include the synchronization mechanism for speed matching when the clutch transitions into the first configuration.

In the third gear, power flows from the electric machine to the input shaft 118 through the first clutch 122 (e.g., one-way clutch) which is overrun to the second clutch 124. Next, power flows through the second clutch 124 to the third gear 134 and from the third gear to the fourth gear 136 on the intermediate shaft 130. The power path then moves to the second gear 128 and from the second gear to the seventh gear 150. Next, the power path moves through the third clutch 148 to the output shaft 149 and from the output shaft to downstream components.

In the fourth gear, depicted in FIG. 2D, the first clutch 122 (e.g., one-way clutch) is engaged, the second clutch 124 is open, and the third clutch 148 is in the first configuration. Therefore, in the fourth gear the power path unfolds as follows: power is transferred from the electric machine to the input shaft 118. From the input shaft 118, power flows through the first clutch 122 to the first gear 126 and the second gear 128 on the intermediate shaft 130. The power path then moves through the interface between the second gear 128 and the seventh gear 150 through the third clutch 148 and to the output shaft 149.

FIG. 2E depicts a table summarizing the configurations of the first, second, and third clutches 122, 124, 148 while the system 102, shown in FIGS. 2A-2D, is operating in different active gears. In the first, second, and third gear modes, the second gear 128 on the intermediate shaft 130, shown in FIGS. 2A-2C, functions as a pinion gear where power indirectly flows between the input, intermediate, and output shafts 118, 130, 148, respectively. Conversely, in the fourth gear mode, shown in FIG. 2D, power flows directly between the input, intermediate, and output shafts 118, 130, 148 between radially aligned gears (i.e., the first gear 126, the second gear 128, and the seventh gear 150). In the fourth gear, the second gear 128 on the intermediate shaft functions as an idler gear. The gear 128 on the intermediate shaft 130 therefore has a dual-use functionality, enabling the gear range in the system to be expanded while maintaining a compact profile. Further, in other embodiments, the system may be designed to operate with three active gears where the second or third gear mode, shown in FIGS. 2B and 2C may be omitted.

FIGS. 3A-3D show another embodiment of a system 300 with a transmission 302. The transmission 302 includes many components that are similar to the transmission 104, shown in FIGS. 1-2D. These components share common numbering and repeated description of these components is omitted for brevity. However, the transmission 302 includes a different clutch arrangement on the output shaft 149. A third clutch 304 and a fourth clutch 306 are specifically provided on the output shaft 149. To elaborate, the third clutch 304 is a friction clutch including friction discs functioning similarly to the friction clutch 124. The fourth clutch 306 is a one-way clutch functioning similarly to the one-way clutch 122. Thus, the fourth clutch may be a passive clutch that is not actively controlled. Additionally, the sixth gear 146 is coupled to the fourth clutch 306 and the fourth clutch is selectively coupled to the output shaft 149. The seventh gear 150 is coupled to the third clutch 304 and the third clutch is selectively coupled to the output shaft 149.

FIG. 3A illustrates the transmission 302 in the first gear. In the first gear, the first clutch 122 is overrun, the second clutch 124 is closed, the third clutch 304 is open, and the fourth clutch 306 is engaged. The power path in the first gear sequentially moves through the following components: input shaft 118, second clutch 124, third gear 134, fourth gear 136, intermediate shaft 130, fifth gear 144, sixth gear 146, fourth clutch 306, and the output shaft 149.

FIG. 3B illustrates the transmission 302 in the second gear. In the second gear, the first clutch 122 is engaged, the second clutch 124 is open, the third clutch 304 is open, and the fourth clutch 306 is engaged. The power path in the second gear sequentially moves through the following components: input shaft 118, first clutch 122, first gear 126, second gear 128, the intermediate shaft 130, the fifth gear 144, the sixth gear 146, the fourth clutch 306, and the output shaft 149.

FIG. 3C illustrates the transmission 302 in the third gear. In the third gear, the first clutch 122 is overrun, the second clutch 124 is closed, the third clutch 304 is closed, and the fourth clutch 306 is overrun. The power path in the third gear sequentially moves through the following components: input shaft 118, second clutch 124, third gear 134, fourth gear 136, intermediate shaft 130, second gear 128, seventh gear 150, third clutch 304, and output shaft 149.

FIG. 3D illustrates the transmission 302 in the fourth gear. In the fourth gear, the first clutch 122 is engaged, the second clutch 124 is open, the third clutch 304 is closed, and the fourth clutch 306 is overrun. The power path in the fourth gear sequentially moves through the following components: input shaft 118, first clutch 122, first gear 126, second gear 128, seventh gear 150, third clutch 304, and the output shaft 149.

FIG. 3E depicts a table summarizing the configurations of the first, second, and third clutches 122, 124, 304, 306 while the system 300, shown in FIGS. 3A-3D, is operating in different active gears. The system 300 again achieves a dual-use functionality for the second gear 128 residing on the intermediate shaft 130 where power either directly flows through the gear in one mode while in other modes the power flow through the gears is circuitous. The system can consequently operate in three or four discrete gears in a space efficient package.

FIG. 4 shows a method 400 for operation of a transmission system. The method 400 specifically corresponds to operation of the transmission system 300, shown in FIGS. 3A-3D. However, the method 400 may be carried out by the transmission system 102 shown in FIGS. 1-2D or may be implemented via other suitable systems, in other examples. Furthermore, the method 400 may be implemented by a controller including a process and memory, as previously discussed.

At 402, the method comprises determining operating conditions. The operating conditions may include input device position (e.g., gearshift lever position), clutch configuration, vehicle speed, vehicle load, engine speed, ambient temperature, etc. The operating conditions may be ascertained via sensor inputs, modeling, look-up tables, and other suitable techniques.

Next at 404, a determination is made to select an active gear for the system. Such as determination may be carried out responsive to driver input. For instance, the driver may interact with a gear shift or other suitable input device to transition the system into the one of the four active gears. However, automatic shifting strategies may be used, in other examples. For instance, transition into the different gears may be implemented based on vehicle speed and/or load. The active gears may be selected from a group of four gears, as previously discussed.

If a first gear is selected, the method proceeds to 406 where the first gear is activated. Activation of the first gear includes closing the second clutch at 408 and opening the third clutch at 410. Alternatively, in the embodiment of the transmission system 102 shown in FIGS. 1-2D, the second clutch may be closed and the third clutch may be placed in the second configuration at block 406. Additionally, in some examples, placing the third clutch in the second configuration may include operating a synchronization mechanism in the clutch to provide speed matching when transitioning into the second configuration.

When the clutch is already in a closed or open configuration, opening or closing the clutch includes maintaining the clutch in the current operational state. Additionally, the second clutch may be hydraulically actuated and lubricated. In such an example, lubricant may be flowed through a passage in the input shaft for clutch actuation as well as disc pack lubrication. It will also be appreciated that in any of the gear modes the electric motor-generator may be operated to generate a rotational output transferred to the input shaft of the transmission.

If a second gear is selected, the method moves to 412 where the second gear is activated. In the second gear, the second clutch is opened at 414 and the third clutch is opened at 416. Alternatively, in the embodiment of the transmission system 102 shown in FIGS. 1-2D, the second clutch may be opened and the third clutch may be placed in the second configuration at block 412.

If a third gear is selected, the method moves to 418 where the third gear is activated. In the third gear, the second clutch is closed at 420 and the third clutch is closed at 422. Alternatively, in the embodiment of the transmission system 102 shown in FIGS. 1-2D, the second clutch may be closed and the third clutch may be placed in the first configuration at block 418. Additionally, in some examples, placing the third clutch in the first configuration may include operating a synchronization mechanism in the clutch to provide speed matching when transitioning into the first configuration.

If a fourth gear is selected, the method moves to 424 where the fourth gear is activated. In the fourth gear, the second clutch is opened at 426 and the third clutch is opened at 428. Alternatively, in the embodiment of the transmission system 102 shown in FIGS. 1-2D, the second clutch may be opened and the third clutch may be placed in the first configuration at block 424. Therefore, in the fourth gear mode in either embodiment, power directly travels through the first, second, and seventh gears while in the other gear modes power indirectly flows through the first, second, and/or seventh.

Method 400 allows the clutches to transition between different selected gears. Consequently, the number of available gears in the system is expanded. Vehicle performance and efficiency may be increased due to the increase in the number of available gears in the system.

FIG. 5 illustrates a timing diagram 500 of a use-case control strategy for a transmission system, such as the transmission system shown in FIGS. 3A-3D. However, it will be appreciated that a similar strategy may be used to operate the clutches during shifting transients in the system 102, shown in FIGS. 1-2D. In each graph of the timing diagram, time is indicated on the abscissa. The ordinates for plots 502 and 504 indicate the operational states (i.e., "Open" and "Closed") of the second and third clutches (e.g., clutch 122 and clutch 304), respectively. The ordinate for plot 506 indicate the system's active gear.

At t1, the transmission is shifted from the third gear to the fourth gear. Responsive to this gear shift, the second clutch is opened and the third clutch is maintained in a closed configuration. In the embodiment of the transmission system shown in FIGS. 1-2D, the second clutch is opened and the third clutch is maintained in the second configuration. It will be understood that the specific clutch control strategy may be more nuanced, in practice. For instance, clutch pressure in the second clutch may be less abruptly ramped down to allow a smoother transition into the fourth gear to unfold and reduce the likelihood of unwanted noise, vibration, and harshness (NVH) occurring during the gear shift. The other gear transitions may occur in a similar manner. For instance, the clutch pressure of one clutch may be ramped up while pressure in another clutch is ramped down or vice versa to provide smoother and uninterrupted transmission power flow.

The technical effect of the transmission systems and operating methods herein is the expansion of the system's available gear ratio in a compact package. Consequently, the transmission's operating gear may more closely match a desired gear range for the vehicle's current operating conditions.

FIGS. 1-2D and 3A-3D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a transmission system is provided that comprises an intermediate shaft rotationally coupled to an input shaft and an output shaft, wherein the input shaft is configured to receive rotational input from an electric machine; a first gear coupled to the intermediate shaft; and a plurality of clutches coupled to the input shaft and the output shaft and configured to: in a first mode, transfer power directly between a second gear coupled to the input shaft, the first gear, and a third gear coupled to the output shaft; and in a second mode, transfer power indirectly between the second gear, the first gear, and/or the third gear.

In another aspect, a method for operation of a transmission system is provided that comprises while the transmission system is operating in a first mode, operating a plurality of clutches to transfer power directly through a first gear coupled to an intermediate shaft arranged between an input shaft and an output shaft; and while the transmission system is operating in a second mode, operating the plurality of clutches to transfer power indirectly through the first gear. The method may further comprise flowing lubricant through the input shaft to a piston actuator in a first clutch coupled to the input shaft, in one example.

In yet another aspect, a transmission system in an electric drive axle is provided that comprises an intermediate shaft rotationally coupled to an input shaft and an output shaft, wherein the input shaft is configured to receive rotational input from an electric machine; a first gear coupled to the intermediate shaft, a second gear coupled to the input shaft, and a third gear coupled to the output shaft; a first clutch and a second clutch coupled to the input shaft; a third clutch coupled to the output shaft; and a controller including executable instructions stored in non-transitory memory that cause the controller to: operate the first, second, and third clutches in a first mode where power is transferred directly between the first gear, the second gear, and the third gear; and operate the first, second, and third clutches in a second mode where power is transferred indirectly between the first gear, the second gear, and/or the third gear.

In any of the aspects or combinations of the aspects, the plurality of clutches may include a first clutch and a second clutch coupled to the input shaft and a third clutch coupled to the output shaft.

In any of the aspects or combinations of the aspects, the third clutch may be a dog clutch.

In any of the aspects or combinations of the aspects, the first clutch may be a one-way clutch and the second clutch may be a first friction clutch.

In any of the aspects or combinations of the aspects, the third clutch may be a second friction clutch.

In any of the aspects or combinations of the aspects, the transmission system may further comprise a lubricant conduit traversing the input shaft and delivering a lubricant to the first friction clutch.

In any of the aspects or combinations of the aspects, the first friction clutch may be actuated via a hydrostatic balance piston.

In any of the aspects or combinations of the aspects, the second mode may be one of a first, a second, or a third gear mode and the first mode may be a fourth gear mode.

In any of the aspects or combinations of the aspects, the electric machine may be an electric machine.

In any of the aspects or combinations of the aspects, in the first mode, power may be directly transferred from a second gear coupled to the input shaft to the first gear and from the first gear to a third gear coupled to the output shaft; and in the second mode, power may be indirectly transferred between the first gear, the second gear, and/or the third gear.

In any of the aspects or combinations of the aspects, in the first mode a first clutch coupled to the input shaft may be engaged and a second clutch coupled to the input shaft may be disengaged.

In any of the aspects or combinations of the aspects, the first clutch may be a one-way clutch and the second clutch may be a first friction clutch and wherein in the first mode, a third clutch coupled to the output shaft may be engaged.

In any of the aspects or combinations of the aspects, the third clutch may be a second friction clutch or a dog clutch.

In any of the aspects or combinations of the aspects, the first clutch may be a one-way clutch and the second clutch may a friction clutch.

In any of the aspects or combinations of the aspects, the transmission system may further comprise a lubricant conduit traversing the input shaft and providing lubricant to a piston actuator in the friction clutch.

In any of the aspects or combinations of the aspects, the third clutch may be a dog clutch.

In any of the aspects or combinations of the aspects, the third clutch may be a friction clutch and the transmission system may further comprise a one-way clutch coupled to the output shaft.

In another representation, an electric drive axle gear box is provided that comprises two actively controlled clutches positioned on an input and an output shaft and axially offset from one another, wherein the two actively controlled clutches are designed to place the gear box in a first state where power flows directly between a first, second, and third radially aligned gear and in a second state where power flows indirectly through one of the first, second, or third radially aligned gear to an output shaft.

As used herein, the term "substantially" is construed to mean plus or minus five percent of the range unless otherwise specified.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of a transmission system, comprising:
   while the transmission system is operating in a first mode, operating a first clutch positioned coaxially to an input shaft and a third clutch positioned coaxially to an output shaft to transfer power sequentially through a first gear coupled to the input shaft, a second gear coupled to an intermediate shaft arranged between the input shaft and the output shaft and a seventh gear coupled to the output shaft; and
   while the transmission system is operating in a second mode, operating a second clutch positioned coaxially to the input shaft and the third clutch to transfer power sequentially through a third gear coupled to the input shaft, the second gear, and the seventh gear.

2. The method of claim 1, wherein:
   in the first mode, the first clutch transfers power through the first gear and the third clutch transfers power through the seventh gear; and
   in the second mode, the second clutch transfers power through the third gear and the third clutch transfers power through the seventh gear.

3. The method of claim 1, wherein in the first mode the first clutch is engaged and the second clutch is disengaged.

4. The method of claim 3, wherein the first clutch is a one-way clutch and the second clutch is a first friction clutch and wherein in the first mode, the third clutch is engaged.

5. The method of claim 4, wherein the third clutch is a second friction clutch.

6. The method of claim 1, further comprising flowing lubricant through the input shaft to a piston actuator in a second clutch.

7. A method for operation of a transmission system, comprising:
   while the transmission system is operating in a first mode, operating a first clutch positioned coaxially to an input shaft and a fourth clutch positioned coaxially to an output shaft to transfer power sequentially through a first gear coupled to the input shaft, a second gear coupled to an intermediate shaft arranged between the input shaft and the output shaft, and a sixth gear coupled to the output shaft; and
   while the transmission system is operating in a second mode, operating a second clutch positioned coaxially to the input shaft and the fourth clutch to transfer power sequentially through a third gear coupled to the input shaft, a fourth gear coupled to the intermediate shaft, a fifth gear coupled to the intermediate shaft, and the sixth gear.

8. The method of claim 7, wherein the first clutch is a one-way clutch and the fourth clutch is a one-way clutch.

9. The method of claim 7, wherein:
   in the first mode, the first clutch transfers power through the first gear and the fourth clutch transfers power through the sixth gear; and
   in the second mode, the second clutch transfers power through the third gear and the fourth clutch transfers power through the sixth gear.

* * * * *